US009594000B2

(12) United States Patent
Farmer et al.

(10) Patent No.: US 9,594,000 B2
(45) Date of Patent: Mar. 14, 2017

(54) VACUUM IMMERSION TEST SET

(71) Applicant: The United States of America as represented by the Secretary of the Navy, Washington, DC (US)

(72) Inventors: Harry Farmer, Cannelburg, IN (US); Timothy Leonard, West Baden, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 201 days.

(21) Appl. No.: 14/590,194

(22) Filed: Jan. 6, 2015

(65) Prior Publication Data

US 2015/0192491 A1 Jul. 9, 2015

Related U.S. Application Data

(60) Provisional application No. 61/924,179, filed on Jan. 6, 2014.

(51) Int. Cl.
*G01M 3/06* (2006.01)

(52) U.S. Cl.
CPC ..................... *G01M 3/06* (2013.01)

(58) Field of Classification Search
CPC ............ G01M 3/06; G01M 3/02; G01M 3/00
See application file for complete search history.

(56) References Cited

U.S. PATENT DOCUMENTS 4,799,384 A * 1/1989 Casali ..................... G01M 3/06
73/45.5

FOREIGN PATENT DOCUMENTS

DE        2721655 A1 * 11/1978  ............. G01M 3/06
GB        1384164 A  *  2/1975  ............. G01M 3/10

* cited by examiner

*Primary Examiner* — Nguyen Ha
(74) *Attorney, Agent, or Firm* — Christopher A. Monsey

(57) ABSTRACT

A leak test apparatus and method is provided which includes an embodiment including a transparent container adapted to selectively permit a device under test to be placed therein, selectively maintain a vacuum, and contain an immersion liquid. The test apparatus further includes a test fixture plate adapted to remain fixed while the container moves along a first axis so as to permit the container to raise or lower with respect to the test fixture plate so as to raise or lower a test fluid with respect to the test fixture plate. The apparatus further includes a support structure adapted to raise or lower the container such that the test fixture plate remains fixed with regard to the container, a vacuum manifold system selectively coupled to the container, and a control system adapted to control raising or lowering of the container and control of vacuum in the container.

13 Claims, 14 Drawing Sheets

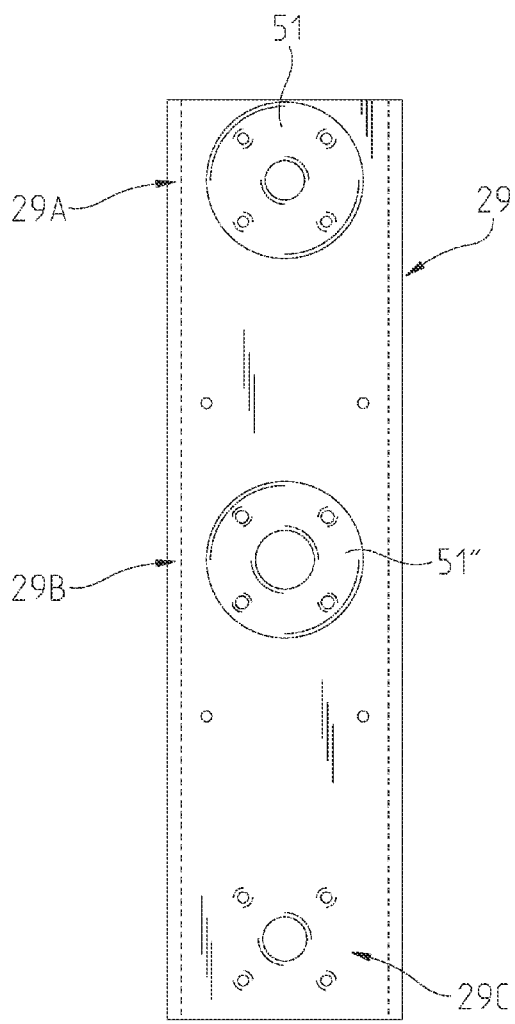
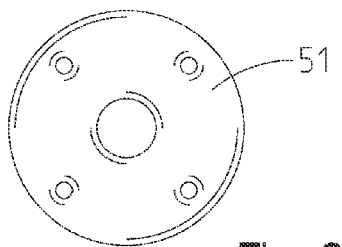
Fig. 8C
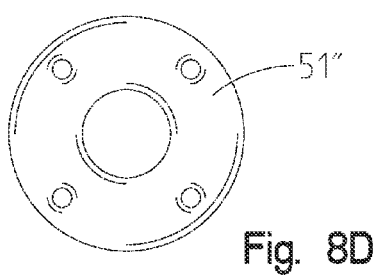
Fig. 8D
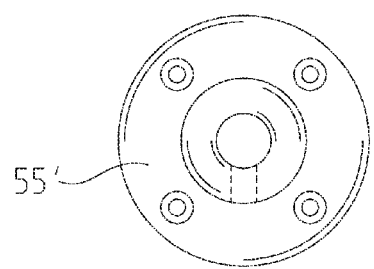
Fig. 8E
Fig. 8A
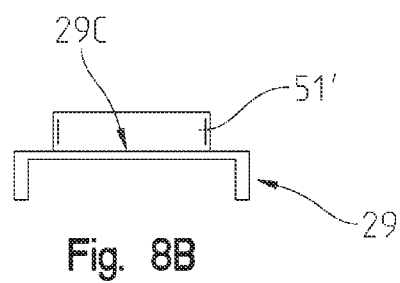
Fig. 8B
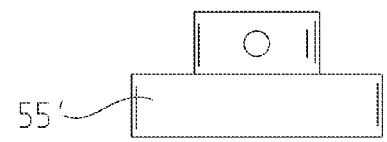
Fig. 8F

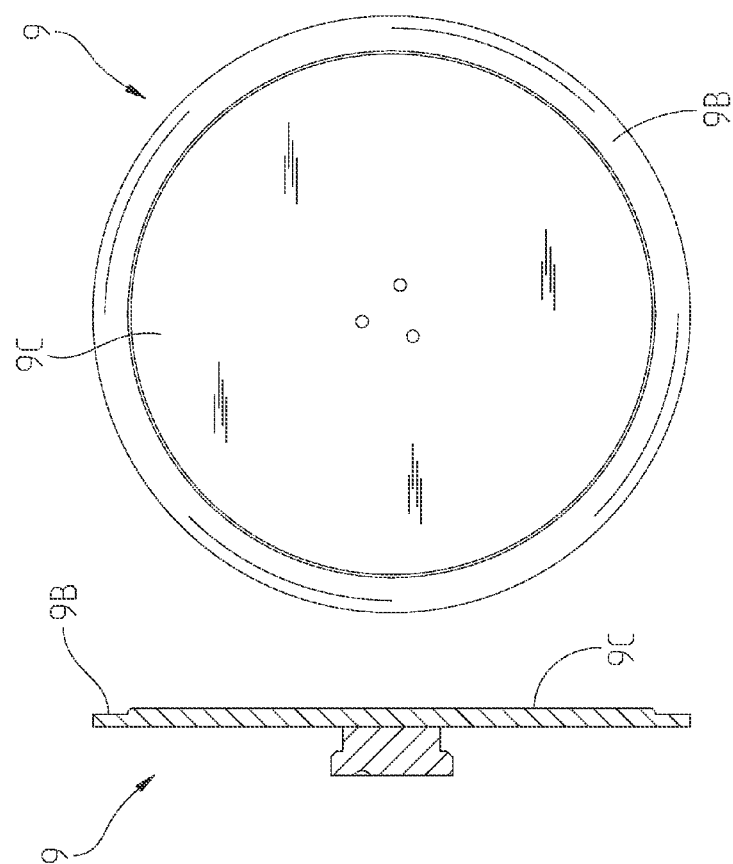
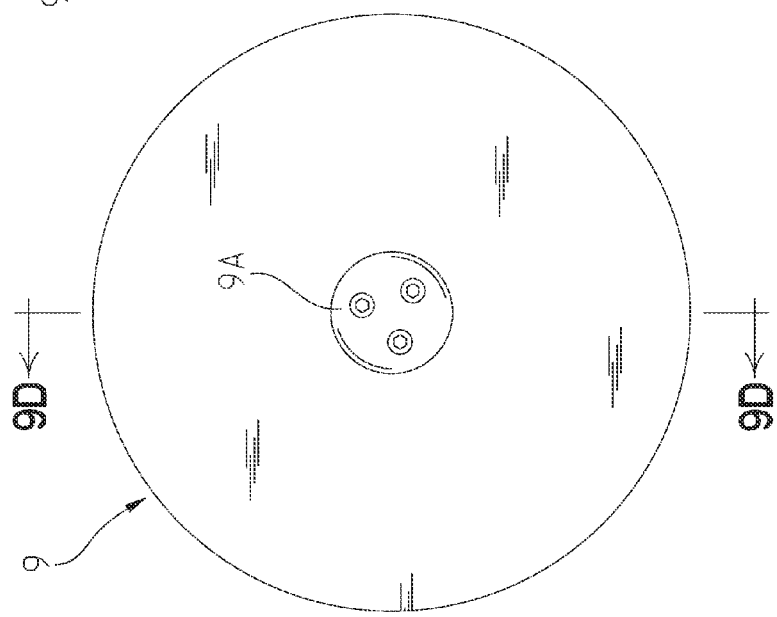

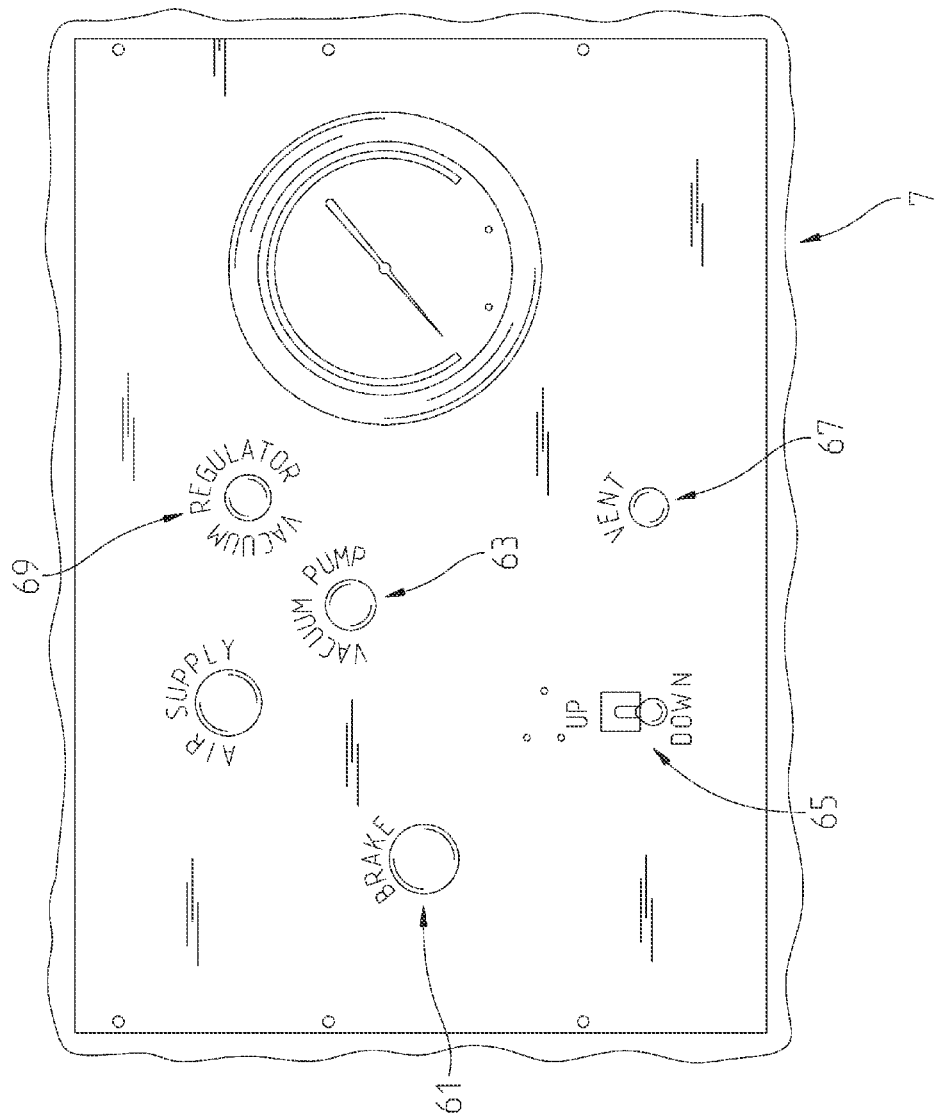

Step 71: providing an iVITS in accordance with an embodiment of the invention to include immersive fluid within a TCTCA

Step 73: opening or actuating a vent knob to close vent; placing a device under test on the test fixture plate

Step 75: installing a sealing lid on the TCTCA that is operable to provide a vacuum seal between the lid and the TCTCA

Step 77: extending the TCTCA upwards so the TCTCA raises the immersive fluid so the device under test is immersed in the immersive fluid to a desired depth, e.g., one inch as the TCTCA moves upward around the test fixture plate

Step 79: activating a vacuum source to create a predetermined vacuum within the TCTCA

Step 81: observing the device under test through the transparent walls of the TCTCA to detect bubbles

Step 83: recording test results

Step 85: lowering or retracting the TCTCA so as to expose the device under test on the test plate by lowering the immersive fluid along with the TCTCA

Step 87: activate the vent to permit atmospheric gas to pass into the TCTCA until a vacuum gauge reads a value indicating equalization with room atmospheric pressure

Step 89: remove the device under test from the text fixture plate

Step 91: clean immersive fluid from the device under test

Step 93: stow the lid

Fig. 13

VACUUM IMMERSION TEST SET

CROSS-REFERENCE TO RELATED APPLICATIONS

The present application claims priority to U.S. Provisional Patent Application Ser. No. 61/924,179, filed Jan. 6, 2014, entitled "VACUUM EMERSION TEST SET," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 103,027) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to the field of testing systems. In particular, embodiments of the invention include exemplary systems adapted to test sealed structures containing one or more gasses as well as having one or more seals adapted to retain such gasses within the sealed structure(s).

A variety of sealed structures exist which have aspects of their apparatus, assembly, assemblies and/or parts sealed at one or more points in a manufacturing process or within a distribution or utilization chain which require subsequent testing. In some cases sealing provides a particular desired effect such as an increase in shelf life or safety related effects. Sealing can be done in combination with other manufacturing or testing steps such as insertion of one or more gasses within the sealed structure which can provide one or more desired effects. Leak testing or seal integrity testing is desirable to ensure desired effects are provided and predictable throughout a desired life cycle including shelf life, transportation, and use.

For example, military safety arming devices (SAD) can be hermetically sealed during initial manufacture. After the safety arming devices are sealed relative to a structure or combination of structures, then such a device and/or structure can be tested to ensure relevant structure(s) and/or seal(s) are functioning as intended and therefore no leakage has occurred. Buyers of such sealed products or structures can perform testing such as lot acceptance testing (LAT) to determine if such seals are in fact performing as desired. All or parts of such device(s), structure(s), assemblies, etc, e.g., SAD, can be tested as a part of LAT. After acceptance or sale, periodic testing can be done on such device(s), structures, assemblies, etc, e.g., SAD, to be evaluated at periodic intervals through surveillance testing which also check assets having, for example, sealed structures such as, e.g., SADs, after exposure to in-service use, shelf conditions, etc to determine if a seal or sealed assembly is still properly sealed. A fine leak test can be performed by a mass spectrometer to determine if any device, assembly, part, structure, etc has experienced a seal failure or loss of integrity that would allow, e.g., interior structure environments to be impacted by such a loss of seal or integrity.

In this example, a SAD can be designed so that in a standard atmosphere the SAD shall not leak helium at a rate greater than $5 \times 10^4$ standard atmosphere cubic centimeters per second (std atm em 3/S). In addition a vacuum immersion test (VIT) (sometimes called a gross leak test) can be performed to look for where a hermetical seal may be broken. Frequently a failure can occur around either the SAD window or another structure, such as a launch latch window. However leaks can also occur at an electrical connector or along the case. A VIT can be performed by placing the SAD in a Vacuum Immersion Bell Jar (VEBJ) filled with isopropyl alcohol (instead of water) and looking for leakage from the SAD. A test requirement can include a need that the SAD shall not leak gas as evidenced in alcohol or de-ionized water by a continuous stream of bubbles emanating from the SAD. Other devices that are hermetically sealed can be tested using this equipment.

One method of testing a SAD can require manual lifting of a heavy part of either or both a test apparatus, test apparatus section, and/or SAD component that creates significant stress/strain to a test operator and required substantial time and effort to perform necessary SAD testing. Such an approach could not only be very labor intensive but suffered from disadvantages such as how sometimes a testing device failed to lock properly in a test set which creates a safety concern. Various disadvantages to such a test approach include damage to a SAD device, test apparatus or injury to a test operator e.g., smash a finger of the operator. Other disadvantages to current methods or systems exist as well such as a substantial probability of bursting a test enclosure e.g., VEBJ. A test operator was required to act quickly and perform several operations and involve in different areas to start a test thus frequently an operator experienced difficulty in focusing on different operations quickly which created substantial opportunity for error. As a result, such testing was requiring excessive duration for testing. An embodiment of the invention provides a variety of advantages to mitigate problems such as discussed above as well as providing reduced testing time (less than half).

According to an illustrative embodiment of the present disclosure, a testing system can include a vacuum test chamber apparatus including a transparent container, e.g., cylindrical structure, capable of withstanding a predetermined pressure differential, e.g., approximately one atmosphere of a pressure differential, and a removable vacuum-tight cover. An actuator, e.g. pneumatic actuator, is provided which raises or lowers the transparent container. A test fixture or platform adapted to hold or support a device under test is provided. The test fixture or platform is formed to fit moveably within the walls of the test chamber's transparent container as well as having a number of holes formed in the fixture or platform adapted to permit free flow of gas or fluid past the test fixture or platform.

An aspect of an embodiment of the invention enables movement of the transparent container up or down relative to the test fixture or platform which is fixed in position relative to the transparent container. Movement of the transparent container upward encapsulates or surrounds the test fixture or platform by the transparent container walls in an extended/un-retracted position. Retraction or lowering the transparent container lowers or retracts the transparent container while the test fixture or platform remains fixed while a device under test remains fixed. The test fixture or platform is supported by a supporting mechanism which, in this embodiment a rod, passes through an aperture in the transparent container so that the fixture or platform remains fixed relative to movement of the container's walls around the fixture or platform.

An immersion liquid is provided in the transparent container which passes through the test fixture or platform when the transparent container is raised and thereby immerses a device under test when the transparent container is raised or extended. In one embodiment, alcohol is used as an immersion fluid which does not degrade the device under test. The immersion liquid falls relative to the test fixture or platform when the transparent container is lowered and thereby exposes the device under test. A variety of ways can be provided to raise or lower the transparent container relative to the test fixture or platform.

An exemplary embodiment can also include a control panel, a vacuum pump or manifold designed to communicate with a vacuum source, a vacuum gage, a source of motive power to the transparent chamber movement control mechanism, an inlet tube from the source of vacuum coupled to the transparent container in an area of the transparent container not submersed by the immersion liquid as well, in some embodiments, an outlet tube.

An exemplary embodiment of a vacuum test chamber, e.g., transparent chamber, has a sealed aperture in the bottom which permits a cylindrical section a pneumatic actuator to extend and retract in the test chamber so as to prevent either air or liquid in the chamber from exiting the chamber past the sealed aperture. An exemplary device under test or test sample and test fluid can also be held at equilibrium with normal room temperature in some embodiments. Procedures for testing are presented herein as well.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIGS. 8A-8F show a detail view of an exemplary embodiment of a top support frame and detail views of coupling or mounting structures used with respect to the top support frame in accordance with one embodiment of the invention such as shown in FIGS. 1-7;

FIGS. 9A-9E show an exemplary embodiment of guide rods used to guide raising and lowering the top support frame and the test chamber lid with handle in accordance with one embodiment of the invention such as shown in FIGS. 1-7;

FIG. 12 shows a closer view of a control panel in accordance with an embodiment of the invention such as shown in FIGS. 1-7.

FIG. 13 shows a process for using the invention.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
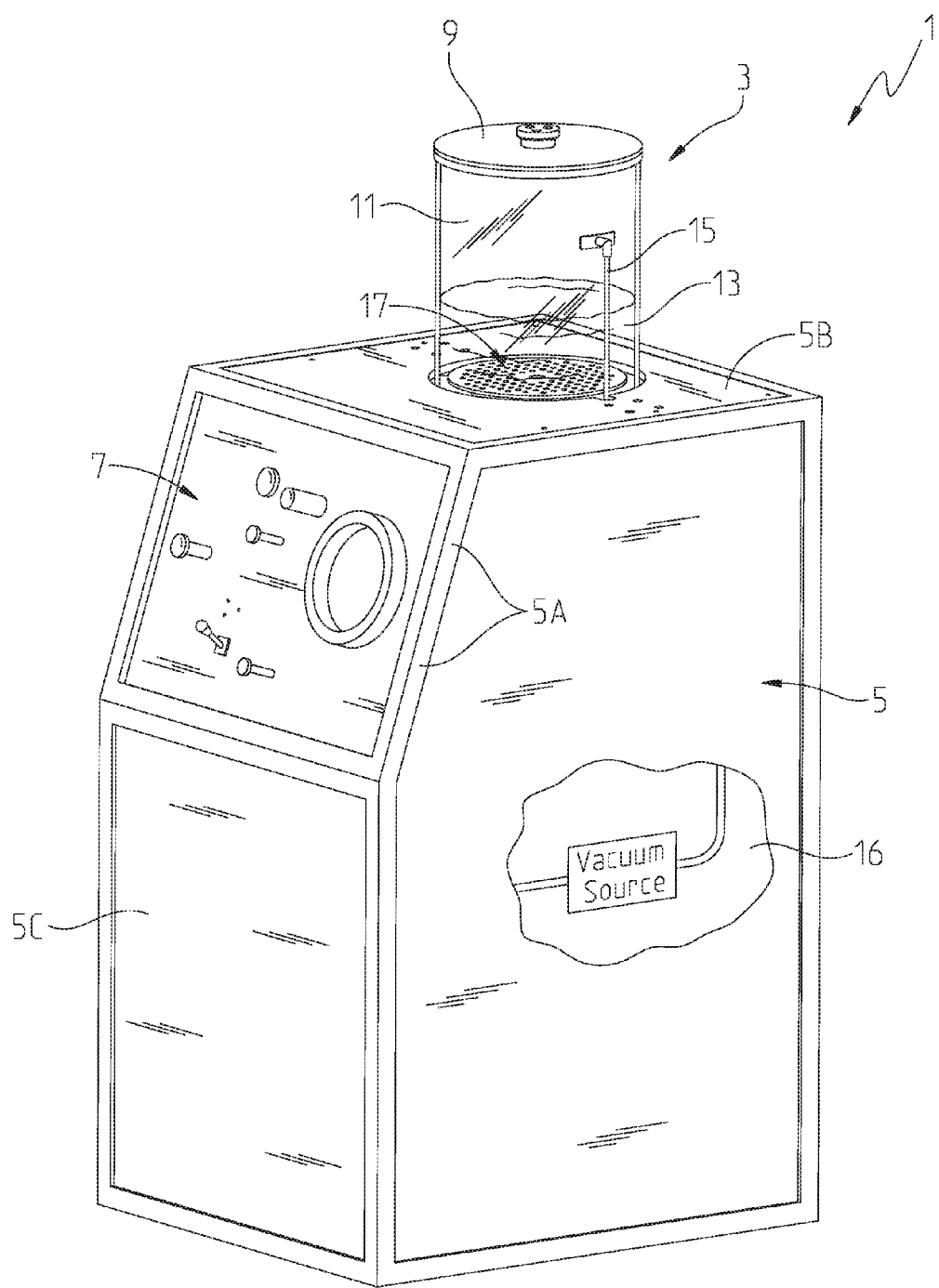
FIG. 1 shows a partial external perspective view of an improved vacuum immersion test system (iVITS) embodiment in accordance with one example of the invention.

Referring to FIG. 1, a partial external view of an embodiment in accordance with one example of the invention is shown. A perspective view of an iVITS apparatus assembly 1 is shown with a test chamber transparent container assembly 3 (hereinafter, TCTCA 3).

Referring to FIG. 1, TCTCA 3 includes a transparent cylindrical tube (TCT) 11 with openings on either end of the TCTCA's 3 tube 11. The TCTCA 3 also has a sealable top plate or lid (herein after "lid") 9 adapted to couple with a top opening in the TCT 11. The TCTCA 3 also includes a bottom plate or base plate 43 (hereinafter base 43) (not shown, e.g., see FIG. 7) that seals to edges of a bottom opening of the TCT 11. Disposed within the TCTCA 3 is a test fixture plate 17 which is adapted to hold a device under test (not shown in this depiction) on the surface of the test fixture plate 17. The TCTCA 3 base 43 is formed with an aperture (not shown) which enables a test fixture plate support and actuator guide rod 33 (hereinafter "actuator guide rod 33") (not shown) to pass through the aperture. The actuator guide rod 33 which supports the test fixture plate 17 and which also passes through the TCTCA base's 43 aperture 43A. The TCTCA 3 base 43 aperture 43A is fitted with a seal (not shown) which permits the TCTCA 3 to retain immersion fluid 13 within its confines while the TCTCA 3 extends or retracts via an actuator 25 (not shown) applying motive force to the TCTCA 3 via a moving a top support 29 (not shown) which supports and is coupled to the TCTCA 3. The top support 29 and the TCTCA 3 extend or retract together (See FIG. 4) when the actuator 25 moves the TCTCA 3/top support 29 up or down around the test fixture plate 17. In this embodiment, the test fixture plate 17 is supported so that it is approximately flush or within close proximity to the top side 5B of the cabinet 5 so as to provide easy access to place or remove a device under test or test article placed on the test fixture plate 17.

The TCTCA 3 is operable and positioned to move in relation to the test fixture plate 17 and a top section of a test system cabinet 5 (hereinafter cabinet 5). Within the cabinet 5, a support structure (not shown) which includes the top support 29 and the actuator 25 that couples with the TCTCA 3 base 43 (not shown), that enables the TCT 11 to extend from or retract into the cabinet 5. An operator control panel 7 is provided on one side of the cabinet 5 on an angled segment 5A of the cabinet to increase ease of use for an operator. In this embodiment, the cabinet 5 has side walls and a top side 5B formed with an aperture adapted to enable the TCT 11 to extend from or retract into the top side 5B of the cabinet 5. The cabinet 5 also has a front access panel 5C that permits access to internal components as well as a rear access panel (not shown). A vacuum tube 15 is coupled to a vacuum source on one end (not shown) through the cabinet top side 5B. The vacuum tube 15 opposing end is coupled to a port in the TCT 11 which is adapted to produce a vacuum within the TCTCA 3 upon application of the vacuum source (not shown) via the control panel 7.

An immersion fluid 13 is placed into the TCTCA 3. The TCTCA 3 is extended or retracted by an actuation system (not shown) within the cabinet 5 which raises or lowers the immersion fluid 13 with respect to the test fixture plate 17 by means of raising or lowering the TCTCA 3 around the test fixture plate 17 so as to submerge or expose a device under test (not shown) that has been placed on the test fixture plate 17.

Figure 2:
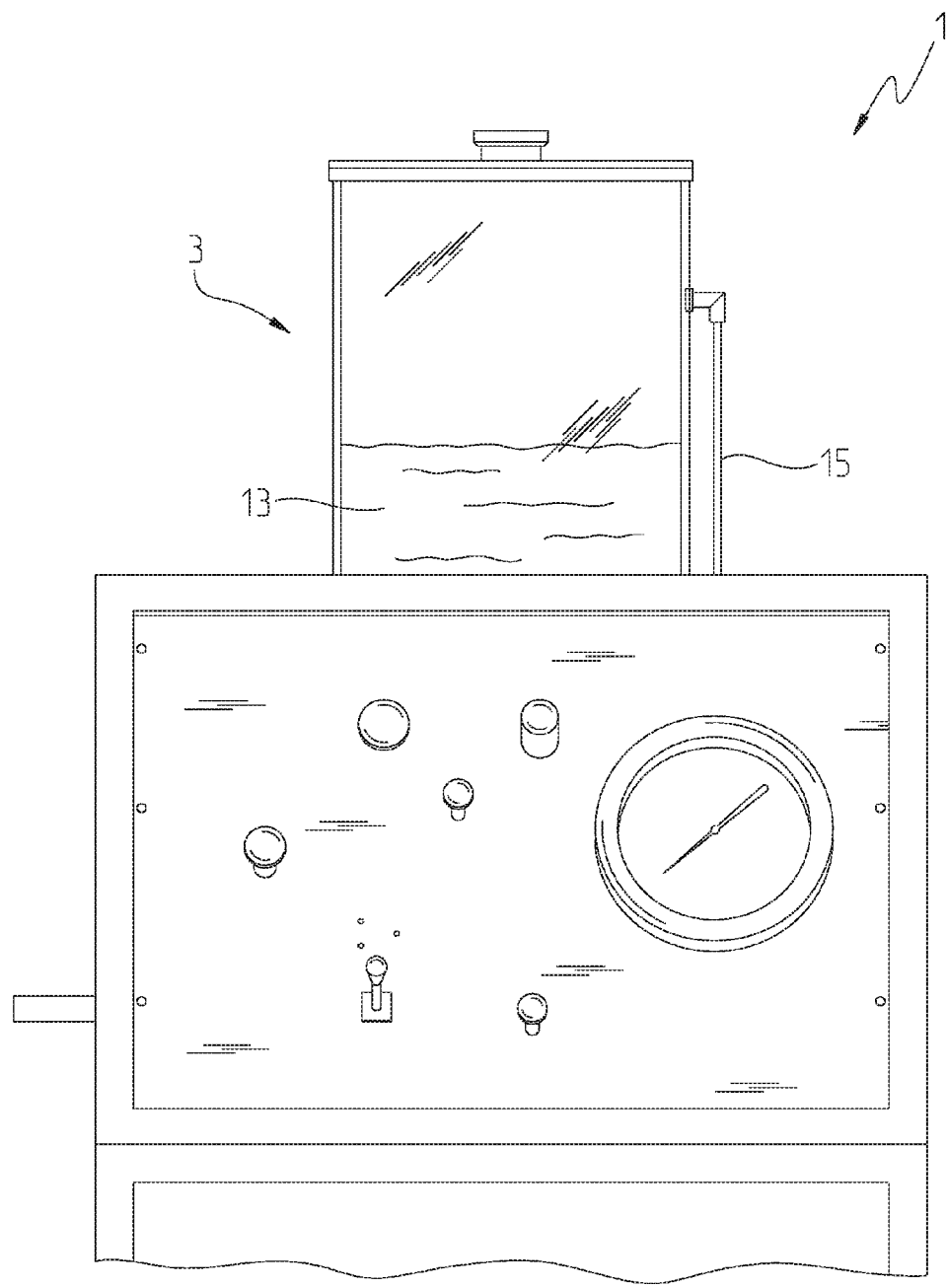
FIG. 2 shows an exemplary front view of an upper section of one embodiment of the FIG. 1 iVITS 1 embodiment with a transparent cylindrical tube section of a test chamber transparent container assembly in an extended position and therefore immersing a test fixture plate adapted to hold a device under test within a test fluid.

FIG. 2 shows an exemplary front view of an upper section of one embodiment of the FIG. 1 iVITS 1 with the TCTCA 3 in an extended position with test fixture plate 17 (not visible from this perspective) submerged within immersion fluid 13.

Figure 3:
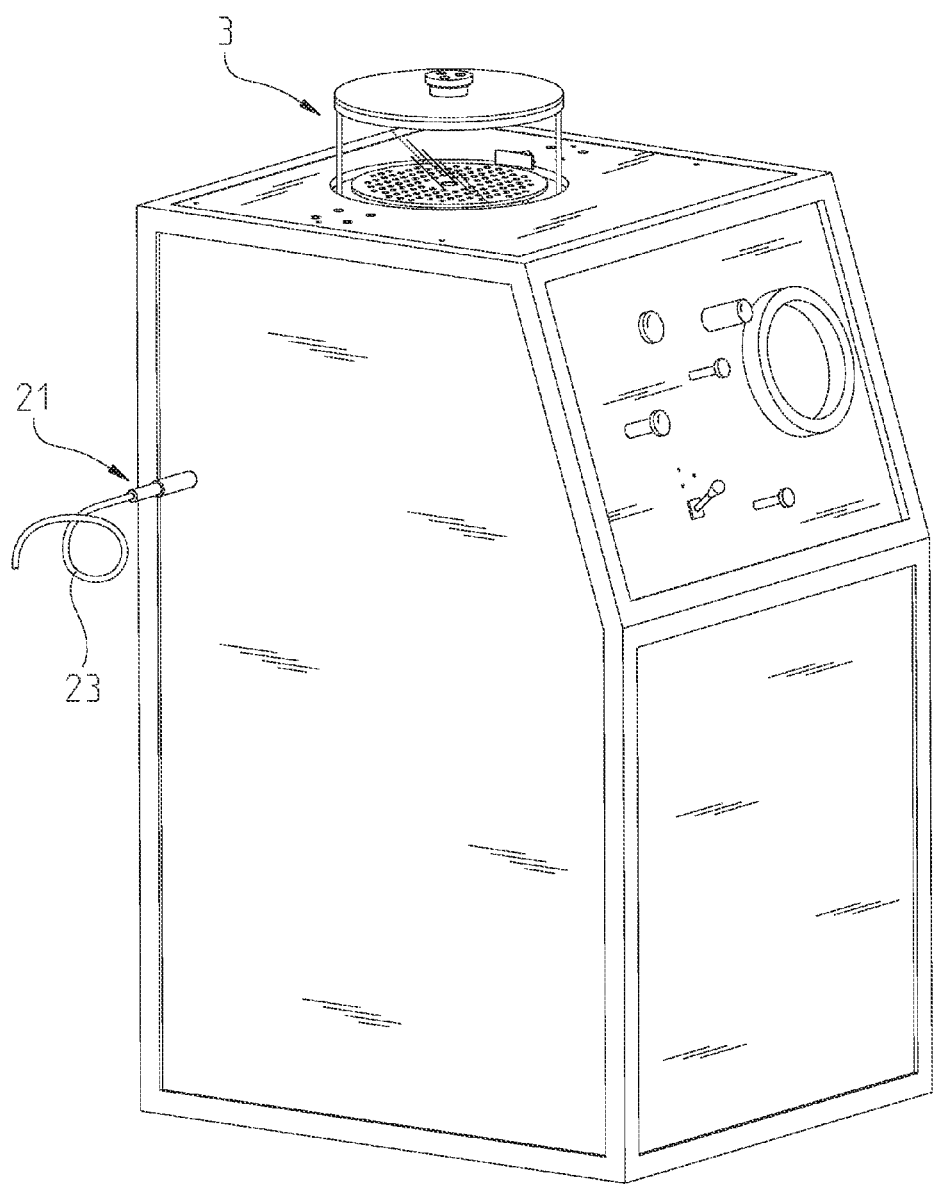
FIG. 3 shows a perspective view of the FIGS. 1 and 2 iVITS 1 exemplary embodiment showing an angled view of a side opposing the FIG. 1 side perspective view.

FIG. 3 shows a perspective view of the iVITS 1 showing an angled view of a side opposing the FIG. 1 side perspective view. A pressurized air source input port 21 is shown coupled to a side of the cabinet 5 which is adapted to receive an air source input line 23. The input port 21 is coupled to equipment inside the cabinet 5. FIG. 3 shows the TCTCA 3 partially retracted into the top side 5B of the cabinet 5.

Figure 4:
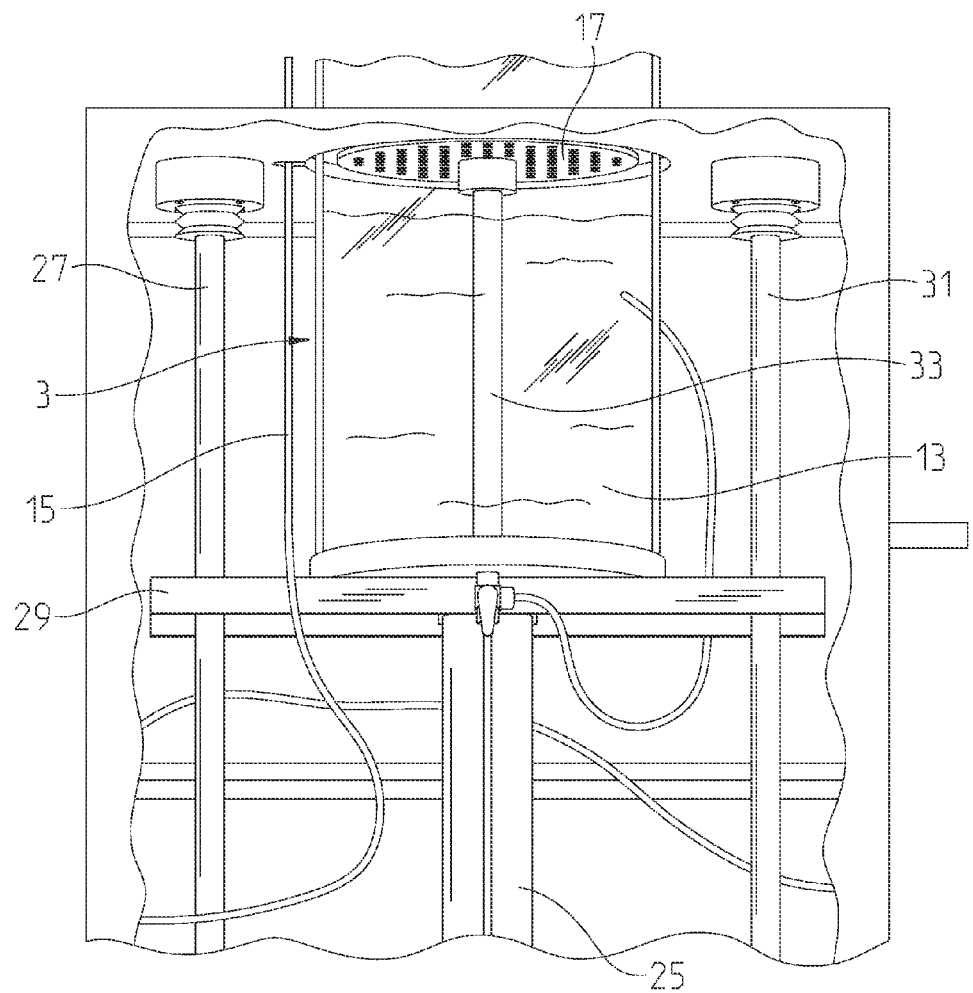
FIG. 4 shows a rear view of an exemplary iVITS 1 cabinet in accordance with the FIGS. 1-3 embodiment's interior with the transparent cylindrical tube section of the test chamber transparent container assembly fully retracted.
Figures 9A, 9B:
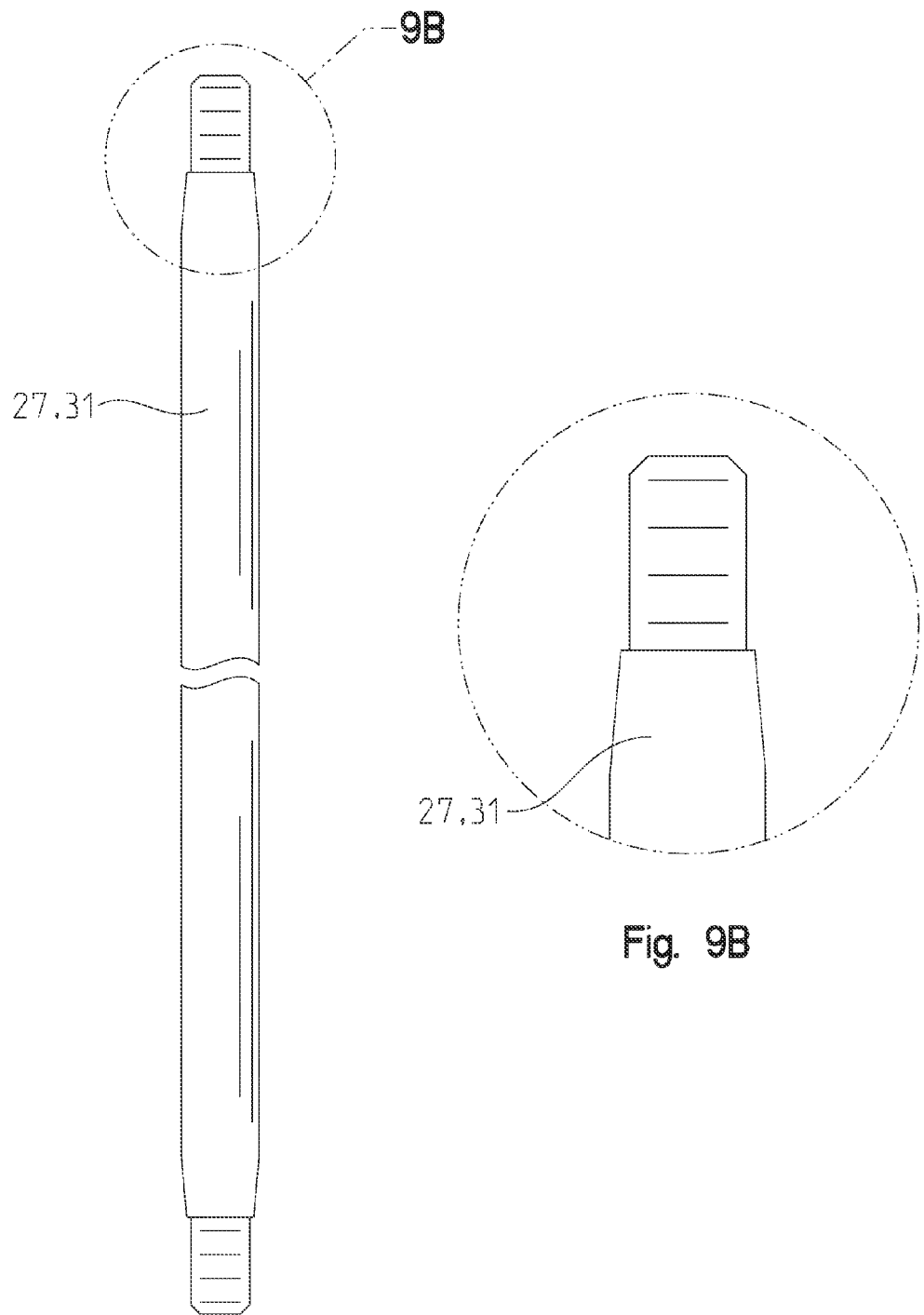

FIG. 4 shows a rear view of the cabinet 5 interior with the TCTCA 3 fully retracted and thereby providing maximum exposure of a device under test that would be placed on the test fixture plate 17. FIG. 4 shows the immersion fluid contained by a lower segment of the TCTCA 3. FIG. 4 also shows a bottom view of the test fixture plate 17 with a plurality apertures formed through the plate 17 which permit the immersion fluid 13 to pass through the test fixture plate 17 when the TCTCA 3 is raised or lowered while the test fixture plate 17 remains fixed relative to the cabinet 5. The support structure within the cabinet 5 also includes guide rods 27, 31 that are positioned on opposite sides of the top support 29. The guide rods 27, 31 slide through mounting structures 51, 51' (51" is not shown in a middle position) coupled to the top support 29 (e.g., with machine screws through the mounting structures into the top support 29) and thereby provide stability to the top support 29 as it moves to extend or retract the TCTCA 3 via actuator 25. Mounting structures, e.g., 51, in this embodiment are disk shaped that have a hole through a center of their disk shape to enable guide rods 27, 31 to slide through the disks so that the disk shaped mounting structures support the top support 29 and provide additional structural support to rod 27, 31/top support 29 interfaces. Note that mounting structures can be positioned on top or on bottom of the top support 29 provided they are positioned to permit the top support 29 to move up and down the guide rods 27, 31 by means of an actuator e.g., 25 (not shown) which can be coupled to a center section of the top support 29 in one embodiment. See, e.g., FIG. 8 for a more detailed view of exemplary guide rods 27, 31 and mounting structures 51, 51", 51'. Note different embodiments can have different structures such as having mounting structures 51, 51' on opposing end portions of an exemplary top support 29 without an additional mounting structure 51' in a center section but instead having an actuator 25 directly connect or interface with the top support 29. For example, see FIG. 10 for a more detailed view of an exemplary test fixture plate 17. See FIG. 9 for a more detailed view of an exemplary lid 9. The exemplary guide rods 27, 31 couple to a bottom side of the cabinet's 5 top side 5B by means of mounting structures 55, 55" attached to a bottom plate 45 of the cabinet 5 (See, e.g., FIG. 9 for diagram of an exemplary bottom plate 45). See FIG. 8 for a more detailed view of the exemplary top support 29. See FIG. 7 for a view of various exemplary elements of support structure 41. A variety of tubes are shown in FIG. 4 which perform a variety of functions including vacuum tube 15 to supply vacuum as well as pneumatic tubes which can supply air to actuator 25. FIG. 4 shows in interior view of the iVITS 1. Actuator 25 can take a variety of forms or embodiments to include a pneumatically operated actuator which is adapted to operate with the actuator guide rod 33 which stays fixed while the actuator moves the top support 29 to extend or retract the TCTCA 3 around the test fixture plate 17. The actuator 25 can be formed to have a moving partition within its body which has an aperture in it that the actuator guide rod 33 passes through. The partition can be attached to a side of a cylinder (not shown) within the actuator. The actuator interior section can be separated into two actuation chambers (not shown) which allow the partition to travel within and thereby move the cylinder (or the actuator itself) up and down the actuator guide rod 33 and thereby move the upper support 29 while leaving the actuator guide rod 33 in a fixed position to support the test fixture plate 17. However, alternate embodiments can move the upper support in a variety of ways including by having a fixed rod or plate support structure supporting the test fixture plate 17 and separate actuators (e.g., actuator 25) that move the upper support 29. For example, actuation chambers (not shown, but see, e.g., actuator 25) can have pressure applied on either side in order to apply differential force to a partition within the actuator 25 and so thereby move the partition and the upper support 29 which slides over actuator guide rod 33. Other embodiments can place an actuator in other locations provided design considerations, including, but not limited to suitability of operation within the overall test set and ability to keep the test fixture plate fixed, permit easy application of vacuum to fluid and device, remain accessible to an operator to place devices under test without needing to maneuver or lower such devices into a test chamber, such as the TCTCA 3, and enabling the system to be able to extend or retract the TCTCA 3 so as to immerse or expose the device under test and permit it to be easily removed or inserted therein are addressed.

Figure 5:
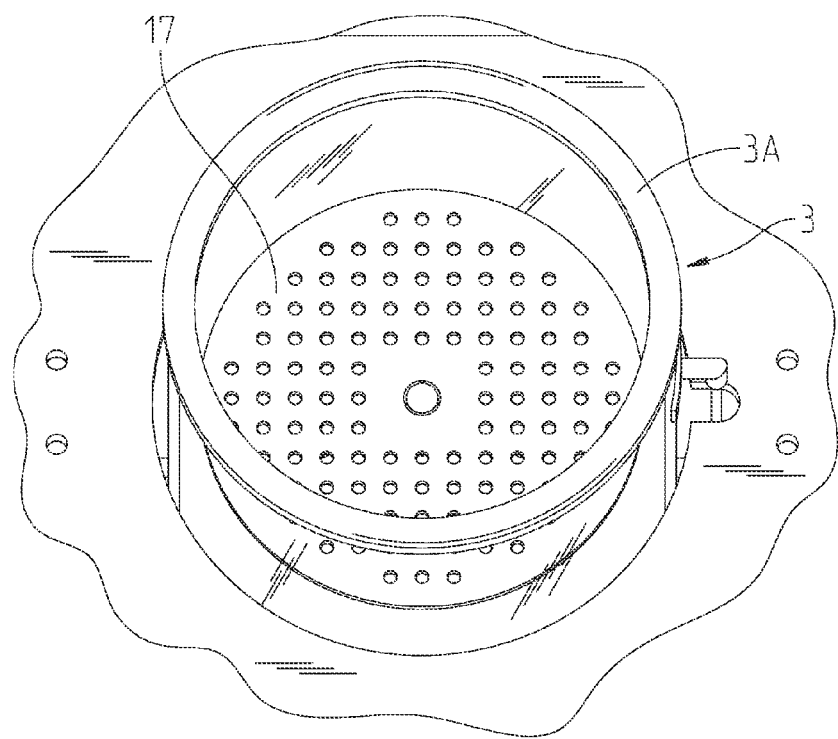
FIG. 5 shows a top lateral view of a portion of the FIGS. 1-4 embodiment including the test fixture plate within a partially retracted transparent cylindrical tube section of the test chamber transparent container assembly with the chamber's lid removed.

FIG. 5 shows a top lateral view of the test fixture plate 17 within a partially retracted TCTCA 3 with the exemplary lid 9 removed. A lid seal 3A is shown around an upper lip of the TCTCA 3 which serves to seal the lid 9 with the TCTCA 3 upper section to facilitate maintaining a negative vacuum pressure in the TCTCA 3.

Figure 6:
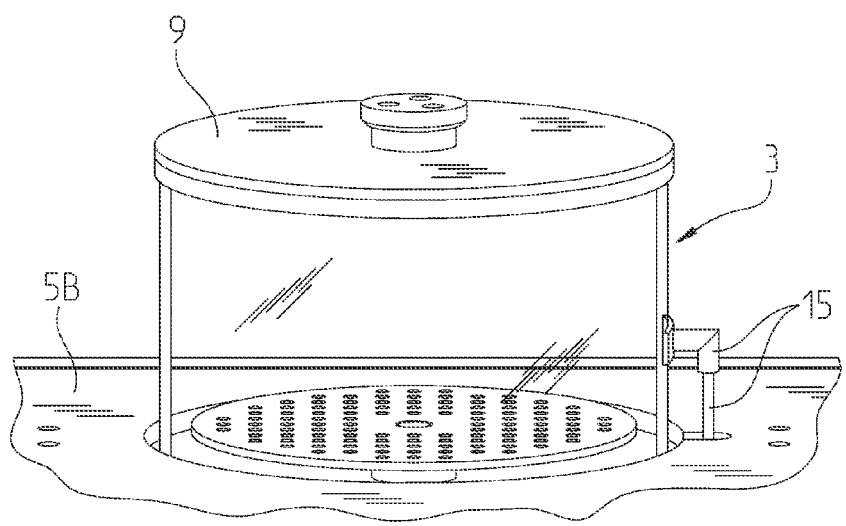
FIG. 6 shows a lateral view of the FIGS. 1-5 embodiment including the test chamber with its lid where the test chamber is shown as partially retracted into this embodiment's cabinet or enclosure.

FIG. 6 shows a lateral view of the TCTCA 3 with the lid 9 installed. The TCTCA 3 is shown as partially refracted into the top side 5B of cabinet 5. Vacuum tube 15 used to apply a vacuum to the TCTCA 3 is shown extending from a side of the TCTCA 3 and passing through an aperture in to top side 5B of the iVITS 1 cabinet 5.

Figure 7:
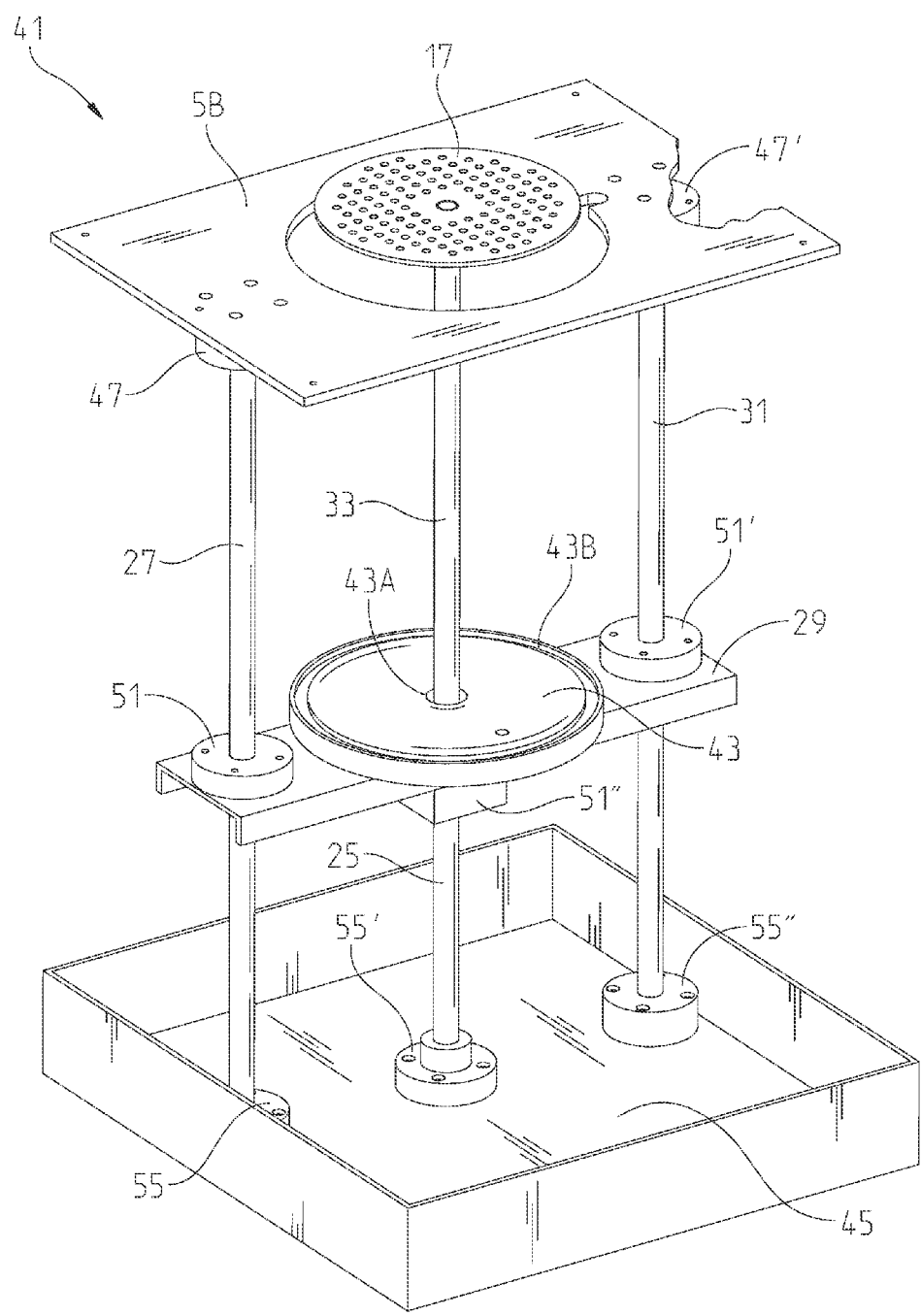
FIG. 7 shows a perspective view of an exemplary test chamber support structure with some elements removed for simplification.

FIG. 7 shows a perspective view of a TCTCA 3 support structure 41 with some elements removed for simplification (e.g., TCT 11 and actuator 25 are removed). Top ends of guide rods 27, 31 couple with top side 5B of the cabinet via coupling structures or mounts 47, 47' by means such as machine screws (not shown). Note that top side 5B can be enclosed within the cabinet or be a top side of the cabinet itself in various embodiments. The top support 29 is shown supporting the TCTCA 3 base 43 which slides up and down the actuator guide rod 33. The actuator guide rod 33 on one end to the test fixture plate 17, through a center section of the base 43, and is coupled on an opposing end to the bottom plate 45 via a coupling structure or mount 55'. The TCTCA 3 base 43 is shown with the aperture 43A discussed above which permits the TCTCA 3 base 43 to slide up and down. A seal (not shown) can be coupled with the test fixture plate 17, the TCTCA 3, and/or the top support 29 to permit actuator guide rod 33 to slide through TCTCA 3 without loss of fluid within the TCTCA 3 and its base 43. In this embodiment, the base's 43 seal surrounding the actuator guide rod 33 to prevent fluid from escaping from the TCTCA 3/base 43 assembly is not shown. The TCTCA 3 base 43 is shown with a channel 43B which is adapted to receive and seal with the TCT 11. Various means of sealing can be provided for use with the TCT 11 and channel 43B including adhesive or other sealing approaches. In this embodiment, channel 43B is adapted, e.g., via a seal or sealing agent, to enable the TCTCA 3 to contain immersion fluid 13.

FIGS. 8A-8F show a detail view of an exemplary embodiment of the top support 29 frame and detail views of coupling or mounting structures 51, 51', 51" in accordance with one embodiment of the invention. Coupling or mounting structure 51" is positioned at a bottom center of the top support 29 and has an aperture to permit the actuator guide rod 33 to pass through it. In this embodiment, all coupling or mounting structures associated with the top support 29 (51, 51', 51") have an aperture which permits respectively the guide rods 27, 31 and actuator guide rod 33 to pass through the coupling or mounting structures 51, 51', 51".

FIGS. 9A-9E show an exemplary embodiment of guide rods 27, 31, lid 9 and, lid handle 9A. In this embodiment, various parts are fabricated from stainless steel including guide rods 27, 31. The guide rod (27, 31) has a taper or smaller diameter at both ends to fit into the coupling or mounting structures (e.g., 55, etc) which can be threaded or not threaded. The lid 9 has a protrusion body section 9C formed to extend away from a body of the lid 9 having a smaller diameter than an upper and outer section so that the smaller diameter body protrusion 9C fits into the TCT 11 upper aperture and seats with a lip 9B formed by the upper and outer section 9B. A variety of coupling mechanisms can be used with the lid 9 to couple it to the TCT 11 including a seal (not shown here) which is adapted to ensure vacuum is preserved within the TCTCA 3 when vacuum is applied to the TCTCA 3. The lip 9B is formed in the lid 9 to extend away from the smaller diameter body protrusion section 9C so as to provide a barrier or stop which prevents the lid from being sucked into the TCTCA 3 when vacuum is applied to the TCTCA 3.

Figure 10A:
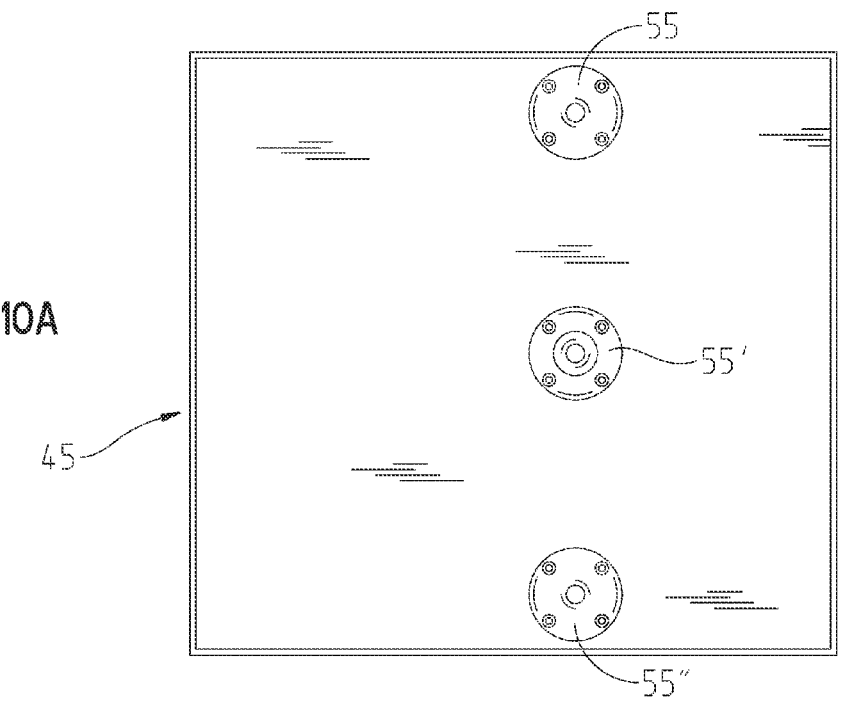
FIGS. 10A and 10B show two top detail views of a bottom plate which guide rods and actuator attach to via mounting structures in accordance with one embodiment of the invention such as shown in FIG. 1-7 where one view shows where the mounting structures are attached and another shows mounting structure holes in the bottom plate with the mounting structures shown.
Figure 10B:
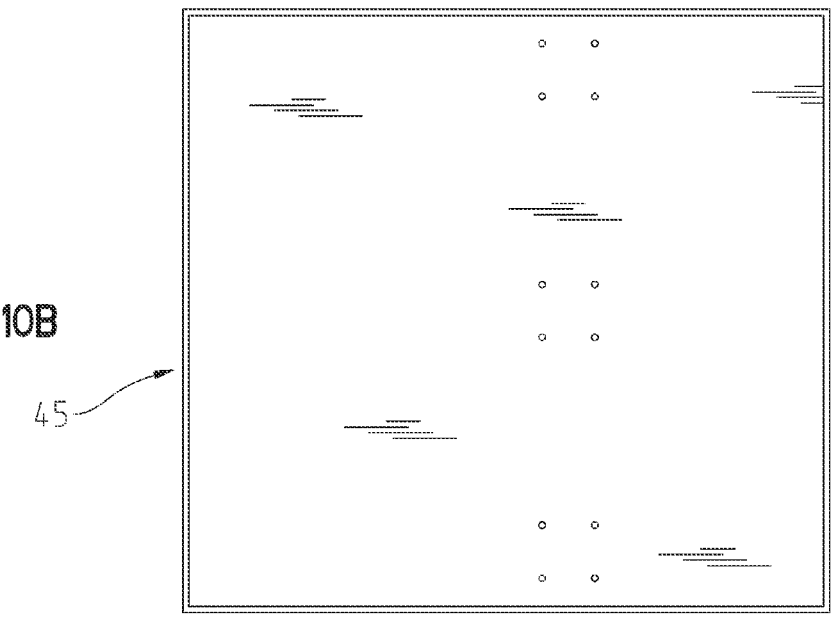
Figure 11A:
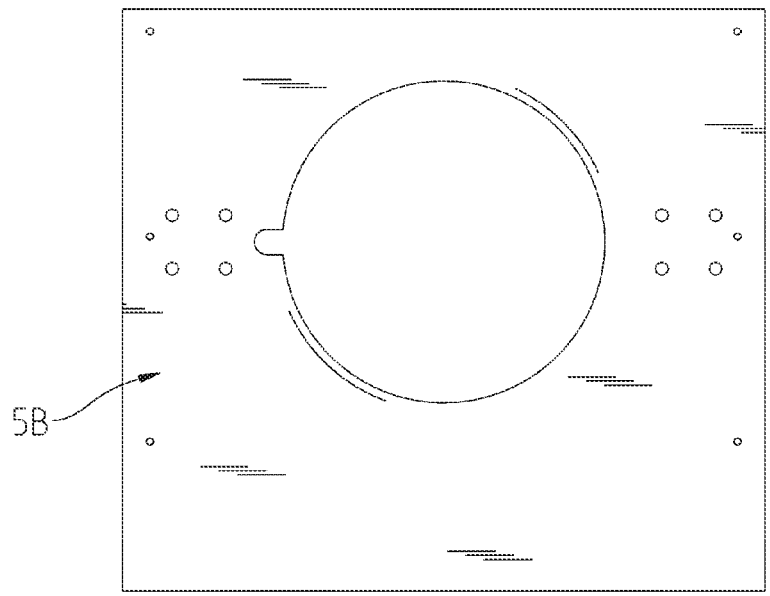
FIGS. 11A-11F show side and top detail views of exemplary test chamber's bottom or base plate, test fixture plate, and a top plate section that guide rods attach to in accordance with an embodiment of the invention such as shown in FIGS. 1-7.
Figure 11B:
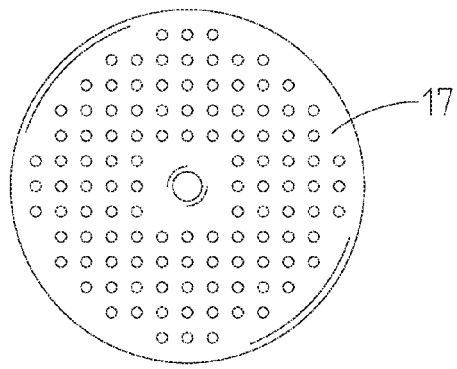
Figure 11C:
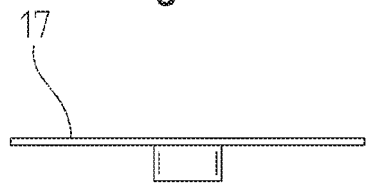
Figure 11E:
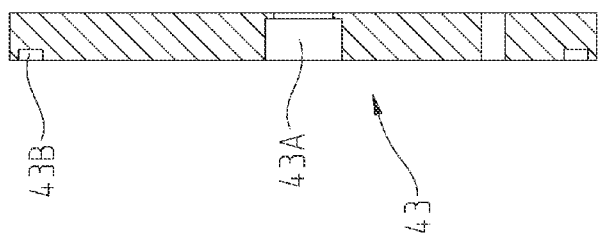
Figure 11D:
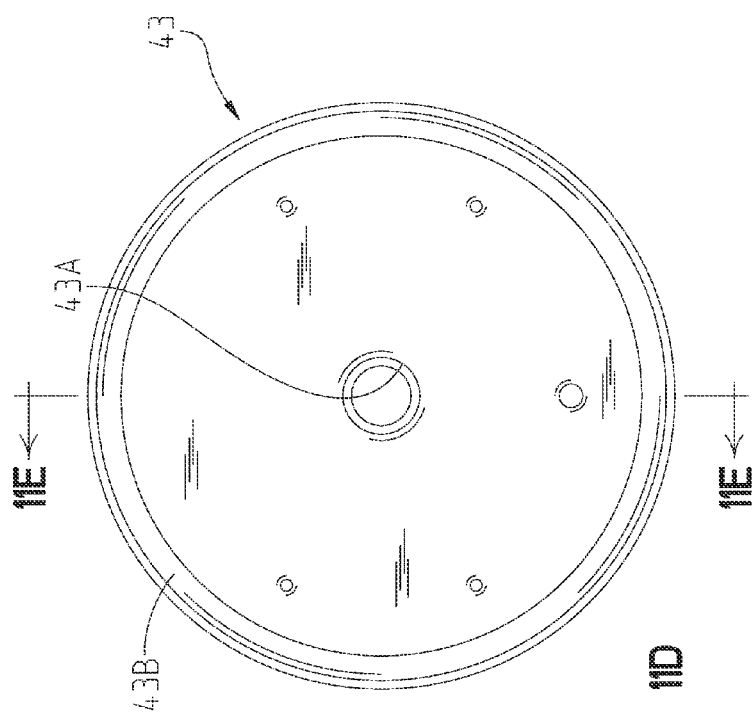
Figure 11F:
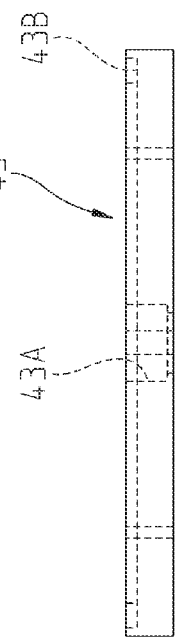

FIGS. 10A and 10B show a detail view of the bottom plate 45 shown in FIG. 7. FIGS. 10A and 10B show locations that coupling structure or mounts 55, 55', and 55" are attached with.

FIGS. 11A-11F show a detail view of TCTCA 3 base 43, test fixture plate 17, and a top plate which is either the top side 5B of the cabinet 5 or an part of the support structure 41 which the guide rods 27, 31 attach to.

FIG. 12 shows a closer view of control panel 7. Controls include a brake 61 for the upper support 29 to halt movement of the upper support 29, a vacuum pump control 63, and up/down control 65, a vent control 67 adapted to vent the TCTCA 3, and a vacuum gage 69.

An exemplary embodiment of the iVITS apparatus 1 in accordance with an embodiment of the invention can be supplied with an air supply where the air supply is set at a predefined value, e.g., 100 psi pressure which can be used for various purposes including operation of an exemplary actuator 25. An embodiment can include designs such as pressure vessel section of a transparent container, e.g., TCT 11 or a bell jar that is capable of holding a desired quantity, e.g., five gallons of isopropyl alcohol inside the container e.g., jar. A test article or device under test, e.g., SAD, can be disposed on a leak detector test plate, e.g., 17, in a test chamber space within the transparent pressure vessel e.g., TCTCA 3, during testing by, e.g., opening the vessel's lid, e.g., 9, and placing the device under test within the test chamber (e.g., transparent container TCTCA 3) on the test plate e.g., 17. The exemplary lid (e.g., 9) can then be closed on the pressure vessel, e.g., the transparent container TCTCA 3 or bell jar in this example, which serves as a leak detector.

A vacuum can then be created in the TCTCA 3 and the device under test can be immersed under isopropyl alcohol within the transparent container (e.g., 3) by extending the TCTCA 3 which raises the immersive fluid 13 while observing visually for bubbles indicating gas leakage. The test fixture plate 17 serves as a test fixture for holding the device under test. An embodiment of the iVITS test set 1 can include components that are automatic air actuated and pneumatic.

An exemplar iVITS testing embodiment can be adapted to work with a device under test, such as a SAD, which is designed with a predetermined set of specifications which are tested by one or more embodiments of the invention, e.g., that, in a standard atmosphere environment, the SAD shall not leak helium at a rate greater than $5 \times 10^4$ standard atmosphere cubic centimeters per second (std atm cm3/S). Other elements can also include automation systems which can automatically detect leakage from a device under test and measure the leakage such as through sensors to include electromagnetic spectrum sensors (e.g., light sensors) and a control system which records such leakage data and produces various analytical outputs or reports. Reports or data outputs can include images of leak locations which such a system can identify along with measurement data of such leakage. Reports or data can also include data on what vacuum or pressure differential existed at the point leakage started occurring. A test specification used with an immersive test can include a need to verify that there will not be a visible indication of gas leakage as evidenced by a continuous stream of bubbles emanating from the device under test, e.g., SAD, when immersed in isopropyl alcohol in a pressure vessel section of an iVITS embodiment for a minimum of, e.g., five minutes.

A process for using the invention can include providing an iVITS 1 in accordance with an embodiment of the invention 71 to include immersive fluid within a TCTCA 3; opening or actuating a vent knob to close vent 73; placing a device under test on the test fixture plate 17 (73); installing a sealing lid on the TCTCA 3 that is operable to provide a vacuum seal between the lid 9 and the TCTCA 3 (75); extending the TCTCA 3 upwards so the TCTCA 3 raises the immersive fluid 13 so the device under test is immersed in the immersive fluid 13 to a desired depth, e.g., one inch as the TCTCA 3 moves upward around the test fixture plate 17 (77); activating a vacuum source 16 to create a predetermined vacuum within the TCTCA 3 (79); observing the device under test through the transparent walls of the TCTCA 3 to detect bubbles 81; recording test results 83; lowering or retracting the TCTCA 3 so as to expose the device under test on the test plate 17 by lowering the immersive fluid along with the TCTCA 3 (85); activate the vent to permit atmospheric gas to pass into the TCTCA 3 until a vacuum gage reads a value indicating equalization with room atmospheric pressure (87); remove the device under test from the test fixture plate 17 (89); clean immersive fluid from the device under test 91; stow the lid 9. The immersive fluid may be isopropyl alcohol.

An additional step may be use of a mass spectrometer to determine whether or not a device under test is leaking a tracing element, e.g., helium, at a greater rate than a predetermined rate associated with a failure in a seal in the device under test.

Another embodiment of the invention can include a sniff test system which is adapted to sample air being removed from the TCTCA 3 to detect a tracer gas which has been pumped into a device under test which may escape from the device under test.

Although the invention has been described in detail with reference to certain preferred embodiments, variations and modifications exist within the spirit and scope of the invention as described and defined in the following claims.

The invention claimed is:

1. A leak test apparatus comprising:
a first structure comprising a support structure;
a second structure comprising a transparent container adapted to selectively open to permit insertion of a device under test therein, maintain a vacuum, and contain a liquid without leakage up to a predetermined pressure differential;
a test fixture plate adapted to remain fixed with respect to the first structure, wherein said test fixture plate and first structure are adapted to permit raising or lowering of the second structure so that said second structure raises or lowers the liquid with respect to the test fixture plate, wherein said test fixture plate is adapted to support the device under test that is subjected to an immersive leak test procedure;
an actuator and moveable support structure adapted to raise or lower said second structure such that said test fixture plate remains fixed with regard to said first structure;
a vacuum manifold system coupled to said second structure including a flexible portion adapted to enable coupling between said manifold system and said second structure; and
a control system adapted to control said actuator operation of raising or lowering of said second structure and connecting of said manifold system to a vacuum source adapted to create a vacuum in said second structure up to a first pressure differential between an atmosphere outside said second structure and within said second structure.

2. An apparatus of claim 1 wherein said test fixture plate has a plurality of structures or openings formed therein that are adapted to permit said liquid to pass through said test fixture plate when said second structure raises or lowers said liquid with respect to said test fixture plate.

3. An immersive test system comprising:
a test support structure that includes a top frame, a bottom frame, a plurality of guide rods comprising a center guide rod and two outer guide rods coupled between the top and bottom frame;
a test fixture plate coupled to one end of the center guide rod so that one surface of the test fixture plate is substantially orthogonal to a longitudinal section of the center guide rod;
a transparent enclosure assembly comprising a transparent enclosure, a base formed with a base center aperture and a recess and a first base seal disposed therein to sealably couple with a first section of the transparent enclosure around an outer section of the base, a second base seal disposed within the base center aperture at a center section of the base operable to permit the center guide rod to pass through the base seal, a lid, a lid seal coupled with a section of the transparent enclosure opposing the base, wherein the transparent enclosure assembly is adapted to contain an immersion fluid;
a vacuum coupling section operable to receive and couple with a vacuum source coupled with the transparent enclosure;
a moveable support section coupled to a side of the base opposing the transparent enclosure and formed with a center aperture formed in a center section of the moveable support section to permit the center guide rod to pass therein, the moveable support section further comprising moveable support apertures on opposing ends of the moveable support section formed to respectively receive and permit movement of respective ones of the outer guide rods there within;
an actuator disposed in connection with or around the center guide rod operable to move the moveable support structure up and down in relation to the center guide rod and so move the base with transparent enclosure containing the immersion fluid vertically with respect to the support structure guide rods and thereby raise or lower the immersive fluid with respect to the test fixture plate; and
a control system operable to control the vacuum source and actuator so as to connect the vacuum source with the transparent enclosure assembly to produce a vacuum within the transparent enclosure assembly as well as controlling the actuator to move the transparent enclosure assembly up or down the guide rods.

4. The system as in claim 3 further comprising a measuring and display section operable to display a vacuum measurement associated with atmospheric conditions within the transparent enclosure assembly.

5. The system as in claim 3 wherein said test fixture plate has a plurality of structures or apertures that are adapted to permit said liquid to pass through said test fixture plate when said test fixture plate moves within said transparent enclosure assembly and thereby raises or lowers the fluid.

6. A method of performing a vacuum immersion test comprising:

providing a test assembly system comprising a text fixture plate, a transparent container assembly, a guide rod orthogonally coupled with the test fixture plate on end, an actuator coupled to the transparent container assembly and moveable around or with respect to the guide rod, wherein the actuator is operable to selectively raise or lower the transparent container assembly, the transparent container assembly is formed and operable to contain an immersion fluid and permit the guide rod to pass through a base of the transparent container assembly so as to raise or lower the transparent container assembly containing the fluid and thereby expose or immerse the test plate fixture with the immersion fluid, a lid operable to seal with and be removable from the transparent container assembly, a control system operable to control the test assembly system to control vacuum and actuator operation of the system, and an vacuum coupling and interface section operable to couple with the control system and a vacuum source and couple with the transparent container assembly so as to be operable to apply a vacuum to an interior of the transparent container assembly;

providing the immersion fluid within the transparent container assembly;

operating the control system to close a vent associated with the control system;

placing a device under test on the test fixture plate;

installing the lid on the transparent container assembly that is operable to provide a vacuum seal between the lid and an opening in the transparent container assembly that permits access to the test fixture plate;

extending the transparent container assembly upwards using the actuator and control system so the transparent container assembly raises the immersion fluid around the fixed test fixture plate so the device under test is immersed in the immersion fluid to a desired depth as the transparent container assembly moves upward around the test fixture plate;

activating the vacuum source and operating the control system to create a predetermined vacuum within the transparent container assembly;

observing the device under test through the transparent walls of the transparent container assembly to detect escaping gas or fluid; and recording test results comprising escape or lack thereof of gas or fluid.

7. A method of claim 6 further comprising:

lowering or retracting the transparent container assembly by the control system and actuator so as to expose the device under test on the test plate;

activating the vent to permit atmospheric gas to pass into the transparent container assembly until a vacuum gage associated with the controls system reads a value indicating equalization with room atmospheric pressure; and removing the lid from the transparent container assembly and removing the device under test from the text fixture plate.

8. A method of claim 6 wherein the immersion fluid may be isopropyl alcohol.

9. A method of manufacturing a test apparatus comprising:

providing a first structure comprising a support structure;
a second structure comprising a transparent container adapted to selectively open to permit insertion of a device under test therein, maintain a vacuum, and contain a liquid without leakage up to a predetermined pressure differential;

providing a test fixture plate adapted to remain fixed with respect to the first structure, wherein said test fixture plate and first structure are adapted to permit raising or lowering of the second structure so that said second structure raises or lowers the liquid with respect to the test fixture plate, wherein said test fixture plate is adapted to support the device under test that is subjected to an immersive leak test procedure;

providing an actuator and moveable support structure adapted to raise or lower said second structure such that said test fixture plate remains fixed with regard to said first structure;

providing a vacuum manifold system coupled to said second structure including a flexible portion adapted to enable coupling between said manifold system and said second structure; and providing a control system adapted to control said actuator operation of raising or lowering of said second structure and connecting of said manifold system to a vacuum source adapted to create a vacuum in said second structure up to a first pressure differential between an atmosphere outside said second structure and within said second structure.

10. A method as in claim 9 wherein said test fixture plate has a plurality of structures or openings formed therein that are adapted to permit said liquid to pass through said test fixture plate when said second structure raises or lowers said liquid with respect to said test fixture plate.

11. A method of manufacturing an immersive test system comprising:

providing a test support structure that includes a top frame, a bottom frame, a plurality of guide rods comprising a center guide rod and two outer guide rods coupled between the top and bottom frame;

providing a test fixture plate coupled to one end of the center guide rod so that one surface of the test fixture plate is substantially orthogonal to a longitudinal section of the center guide rod;

providing a transparent enclosure assembly comprising a transparent enclosure, a base formed with a base center aperture and a recess and a first base seal disposed therein to sealably couple with a first section of the transparent enclosure around an outer section of the base, a second base seal disposed within the base center aperture at a center section of the base operable to permit the center guide rod to pass through the base seal, a lid, a lid seal coupled with a section of the transparent enclosure opposing the base, wherein the transparent enclosure assembly is adapted to contain an immersion fluid;

providing a vacuum coupling section operable to receive and couple with a vacuum source coupled with the transparent enclosure;

providing a moveable support section coupled to a side of the base opposing the transparent enclosure and formed with a center aperture formed in a center section of the moveable support section to permit the center guide rod to pass therein, the moveable support section further comprising moveable support apertures on opposing ends of the moveable support section formed to respectively receive and permit movement of respective ones of the outer guide rods there within;

providing an actuator disposed in connection with or around the center guide rod operable to move the moveable support structure up and down in relation to the center guide rod and so move the base with the transparent enclosure containing the immersion fluid vertically with respect to the support structure guide rods and thereby raise or lower the immersion fluid with respect to the test fixture plate; and providing a control system operable to control the vacuum source and actuator so as to connect the vacuum source with the transparent enclosure assembly to produce a vacuum within the transparent enclosure assembly as well as controlling the actuator to move the transparent enclosure assembly up or down the guide rods.

12. The method as in claim 11 further comprising providing a measuring and display section operable to display a vacuum measurement associated with atmospheric conditions within the transparent enclosure assembly.

13. The method as in claim 11 wherein said test fixture plate has a plurality of structures or apertures that are adapted to permit said liquid to pass through said test fixture plate when said test fixture plate moves within said transparent enclosure assembly and thereby raises or lowers the fluid.

* * * * *